United States Patent [19]

Miyazawa

[11] Patent Number: 5,077,681
[45] Date of Patent: Dec. 31, 1991

[54] SYSTEM FOR SOURCE IMAGE TRANSFORMATION

[75] Inventor: Atsushi Miyazawa, Kawasaki, Japan

[73] Assignee: International Business Machines Corporation, Armonk, N.Y.

[21] Appl. No.: 322,757

[22] Filed: Mar. 13, 1989

[30] Foreign Application Priority Data

Mar. 15, 1988 [JP] Japan ............................. 63-59569/88

[51] Int. Cl.$^5$ ............................................. G06F 15/62
[52] U.S. Cl. .................................................... 395/119
[58] Field of Search ........................ 364/518, 521, 522; 358/83; 340/747

[56] References Cited

U.S. PATENT DOCUMENTS

4,005,258 1/1977 Dory .................................. 358/83 X
4,343,037 8/1982 Bolton .................................. 364/521

Primary Examiner—Gary V. Harkcom
Assistant Examiner—Mark K. Zimmerman
Attorney, Agent, or Firm—Mark S. Walker; George E. Clark

[57] ABSTRACT

Image processing apparatus for performing transformation from a source image to a target image along a number of consecutive lines parallel to a coordinate axis of the source image of said target image. The apparatus includes a point generator that sequentially determines target image points near a desired hyperbola, and outputs a number of lattice points as an approximation of the hyperbola. The apparatus maps between coordinates of pixels of the source image and coordinates of pixels of the target image based on the output of the points generator; and determines pixel values of the target image based on results of the mapping and the values of source image pixels.

3 Claims, 6 Drawing Sheets

SYSTEM FOR SOURCE IMAGE TRANSFORMATION

BACKGROUND OF THE INVENTION

1. Field of the Invention

The present invention relates to image processing apparatus capable of performing so-called image transformation processing in which uncoded source image information defined in a rectangular area on a plane is projected on a quadrangular area delimited by any four points on the same plane, and more particularly to a device that can perform the transformation with a smaller amount of calculation by employing a point generator.

The image processing apparatus of the invention can apply to a digital display such as a CRT (cathode ray tube), a digital plotter, or a matrix printer.

2. Prior Art

Geometric transformation processing of image information is one of the basic technologies in the field of image processing. Transformation is an important geometric transformation facility for a two-dimensional image because it has the feature of mapping the source image information defined in a rectangular area on the plane to any quadrangular area on the same plane while maintaining the linearity of the image. This allows, for example, providing of free transforming operation of image data on an animation system or the like, application of the so-called texture mapping processing, in which the image is pasted in a plane given in a three-dimensional space, and removal of distortion occurring when an image is entered, which cannot be completely eliminated by expansion/reduction or rotation.

The projective transformation on a plane is determined by four sets of corresponding points. The correspondence between the coordinates of pixels of the source image (x, y), and the coordinates of pixel after the transformation (x', y') is mathematically defined by the following equation using homogenous coordinates.

$$\begin{bmatrix} x_1' \\ x_2' \\ x_3' \end{bmatrix} = \begin{bmatrix} a & b & m \\ c & d & n \\ p & q & s \end{bmatrix} = \begin{bmatrix} x_1 \\ x_2 \\ x_3 \end{bmatrix} \quad (1)$$

wherein, $x_1 = x$, $x_2 = y$, $x_3 = 1$,
$x' = x_1'/x_3'$, $y' = x_2'/x_3'$

Figure 9A:
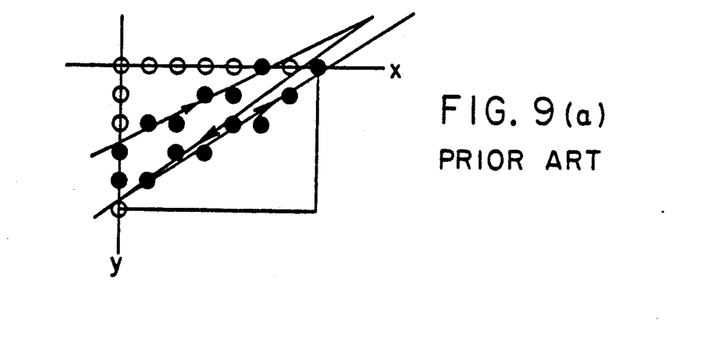
FIGS. 9(a) and 9(b) and 10(a) and 10(b) are graphs illustrating a prior art transformation technique.
Figure 9B:
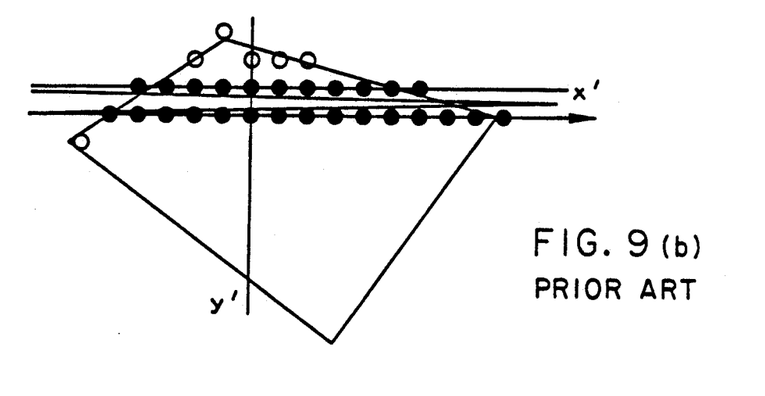
Figure 10A:
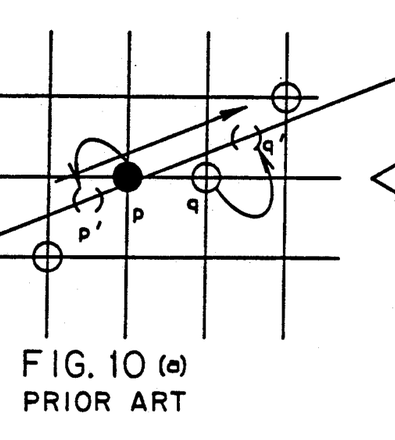
Figure 10B:
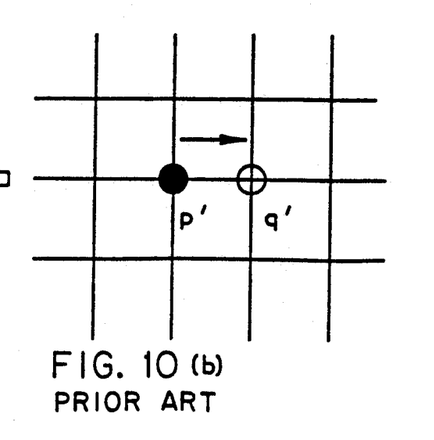

FIG. 9(a) (prior art) shows the source image information defined on a point, while FIG. 9(b) (prior art) similarly shows information of an image after transformation (target image) in accordance with the prior art. To perform the transformation for mapping the source image to the target image, the reverse operation of the above-mentioned definition equation (1) is performed, that is, after the mapping from the target image to the source image $$x = (A_1 x' + B_1 y' + C_1)/(D_1 x' + E_1 y' + F_1)$$

$$y = (A_2 x' + B_2 y' + C_2)/(D_1 x' + E_1 y' + F_1) \quad (2)$$

wherein,
$A_1 = ds - nq$, $B_1 = mq - bs$, $C_1 = bn - dm$,
$A_2 = np - cs$, $B_2 = as - mp$, $C_2 = cm - an$,
$D_1 = cq - dp$, $E_1 = bp - aq$, $F_1 = ad - bc$ is found, corresponding positions on the source image (p', q' in FIG. 10(a)) (prior art) are found for each pixel of the target image (p', q' in FIG. 10(b)) (prior art) while raster scanning over a rectangular area circumscribing the target image, and then the source image nearest to the positions is made with the values of their pixels (p, q in FIG. 10(a)) the output to the target image. The reason why the mapping reverse to the definition equation (1) is used lies in that the mapping from the source image in the definition equation (1) to the target image may cause gaps in the target image. In such a case, some processing becomes necessary, which is cumbersome.

However, calculation of the above equation requires operations of eight multiplications, eight additions and subtractions, and two divisions. This means that an enormous amount of calculation is required for the transformation processing.

The conventional prior art projective transformation is described in detail in "Computer Image Processing and Recognition" by Ernest L. Hall, Academic Press, pp. 86-88.

SUMMARY OF THE INVENTION

The invention utilizes the fact that transformation is usually performed along a plurality of continuous lines parallel to one coordinate axis of the source image or a target image. As described in the prior art, in the most typical example, the transformation is performed along the scanning line of the target image. Then, the value of y' of the equation (2) becomes a constant for the transformation of pixels on one scanning line. Both data x and y on the coordinates for pixels of the source image are expressed in a linear fractional function of x'. Because the linear fractional function corresponds to an equilateral hyperbola, the mapping of the equation (2) results in generation of a hyperbola.

The same is true when the projective transformation is performed along the subscanning direction of the target image, or when it is performed along the main scanning direction or the subscanning direction of the source image.

In the invention, the hyperbola is incrementally generated by using a recurrence formula to easily perform the projective transformation.

DETAILED DESCRIPTION OF A PREFERRED EMBODIMENT OF THE INVENTION

An embodiment of the invention is described with reference to the attached drawing.

Figure 2:
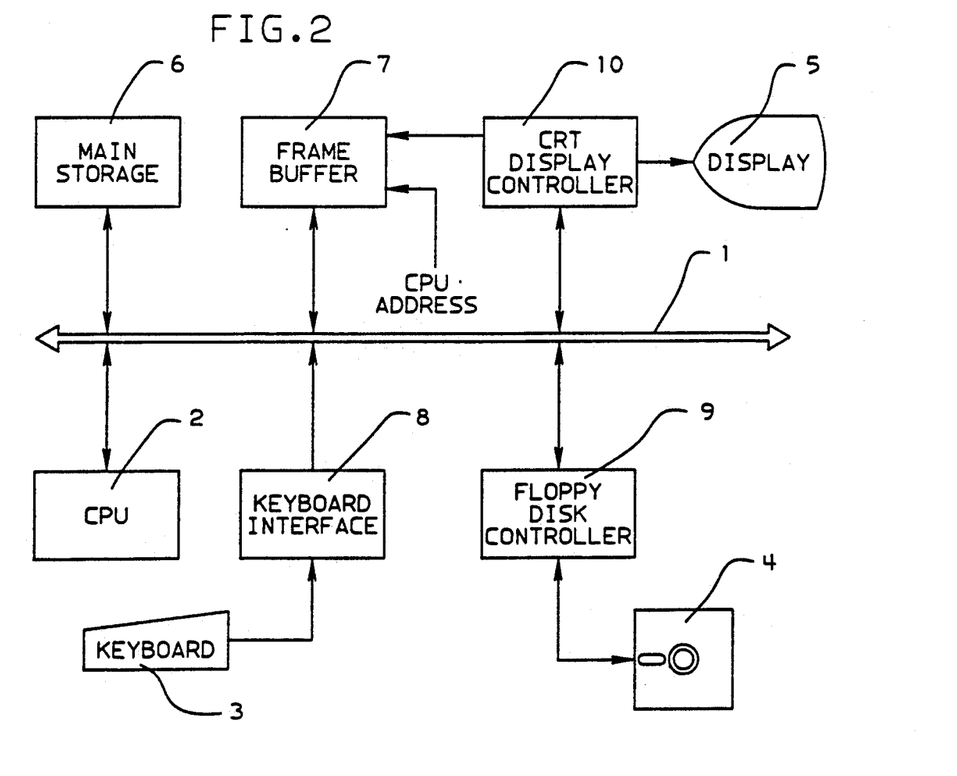
FIG. 2 is a block diagram illustrating a personal computer system that is used for the embodiment of FIG. 1.

FIG. 2 illustrates an overview of a personal computer system that is used in the embodiment. The system may be an IBM Personal System/2. In FIG. 2 a data bus 1 is connected with a CPU 2, a keyboard 3, a floppy disk drive 4, a CRT display 5, a main storage 6, a frame buffer 7 and the like. AS interfaces, a keyboard interface 8, a floppy disk controller 9 and a CRT display controller 10 are provided between the keyboard 3, the floppy disk drive 4 and the CRT display 5, and data bus 1, respectively. In the figure, components such as an address bus, a control bus and a ROM are omitted.

The CRT display 5 may be, for example, a 15-inch monochrome display that can display $1024 \times 768$ dots in a spot of about 0.22 mm. The frame buffer 7 has a capacity that can support the all points addressable graphic mode of $1024 \times 768$ dots. The frame buffer 7 is addressable by the CPU 2 and the CRT display controller 10. It allows graphic data to be written into the frame buffer 7 according to CPU addresses, or the contents of the frame buffer 7 to be read. The CRT display controller 10 accesses the frame buffer 7 to display its contents on the CRT display 5, in response to a vertical synchronizing signal and a horizontal synchronizing signal for the CRT display 5.

Figure 1:
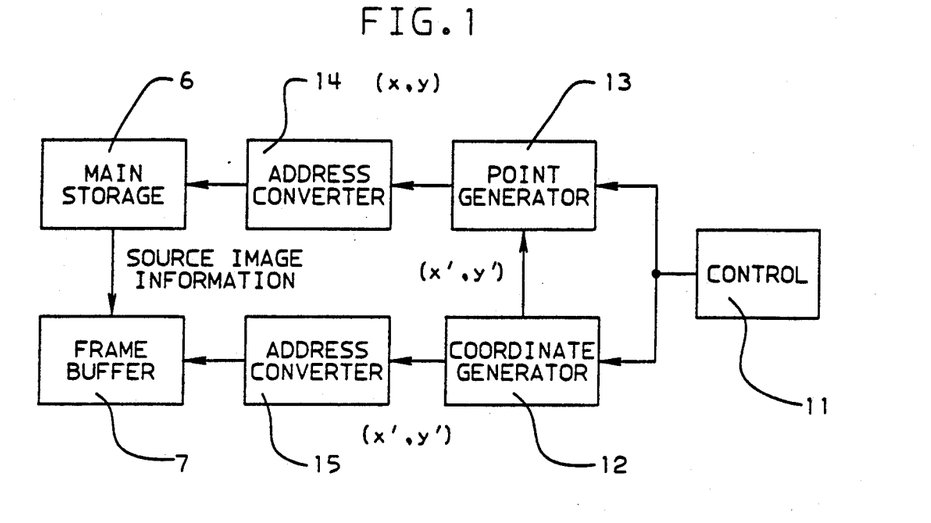
FIG. 1 is a block diagram illustrating the functions of the projective transformation executed by an embodiment of the invention.
Figure 3:
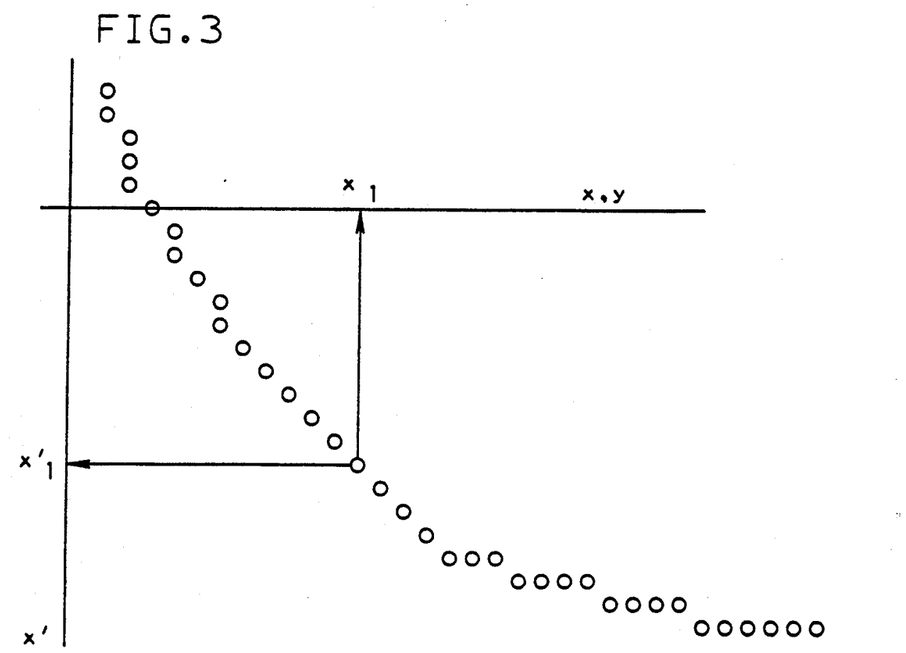
FIG. 3 is a graph illustrating the mapping from a target image to a source image in the embodiment of FIG. 1.

FIG. 1 shows the projective transformation functions executed by the system of FIG. 2 in blocks. In FIG. 1, a coordinate generator 12 generates data $x'$ and $y'$ relating to the coordinates of the target image under control of the control block 11. The coordinates $(x', y')$ are sequentially determined so as to be along the scanning line of the target image. That is, an operation in which $y'$ is set, and then $x'$ is varied while keeping the $y'$ constant, is repeatedly performed. The coordinate data $x'$, $y'$ from the coordinate generator 12 are supplied to a point generator 13. In a range where $y'$ is constant as described above, both data x and y on the coordinates of the source image are expressed as a linear fractional function for $x'$, and correlated to $x'$ by the hyperbola as shown in FIG. 3. For example, a predetermined coordinate value $x_1$ of the source image is correlated to a coordinate value $x_1'$ of the target image as indicated by an arrow. The point generator 13 determines, under control of the control block 11 parameters for the hyperbola based on $y'$ and information on four sets of corresponding points specifying the transformation, and then outputs data of the hyperbola corresponding to x and y. The output data x, y from the point generator 13 are supplied to an address converter 14, based on which the source image information in the main storage is accessed. The source image information is stored in the main storage 1, and accessed by:

(Effective address 1)=(Base address 1)+y x (Raster length 1)+x*

Figure 4:
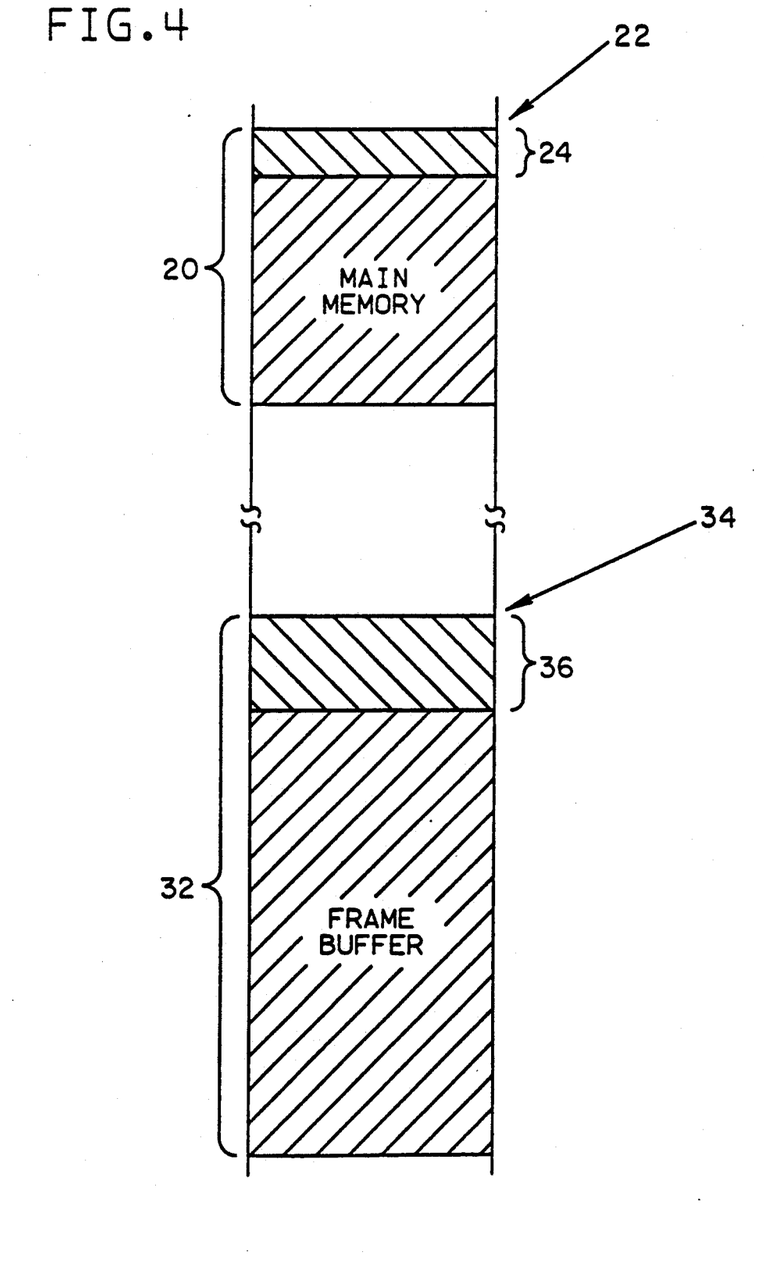
FIG. 4 is a diagram illustrating a stored state of the image information in the embodiment of FIG. 1.

On the other hand, the coordinate data $(x', y')$ from the coordinate generator 12 are supplied to another address converter 15. It is for addressing the target image information region (FIG. 4) in the frame buffer 7, and arranged to write the accessed source image information in an address of:

(Effective address 2)=(Base address 2)+y'* (Raster length 2)+x'.

This causes an image after the transformation, that is, the target image to be stored in the frame buffer 7, and then to be displayed on the CRT display 5.

Figure 5:
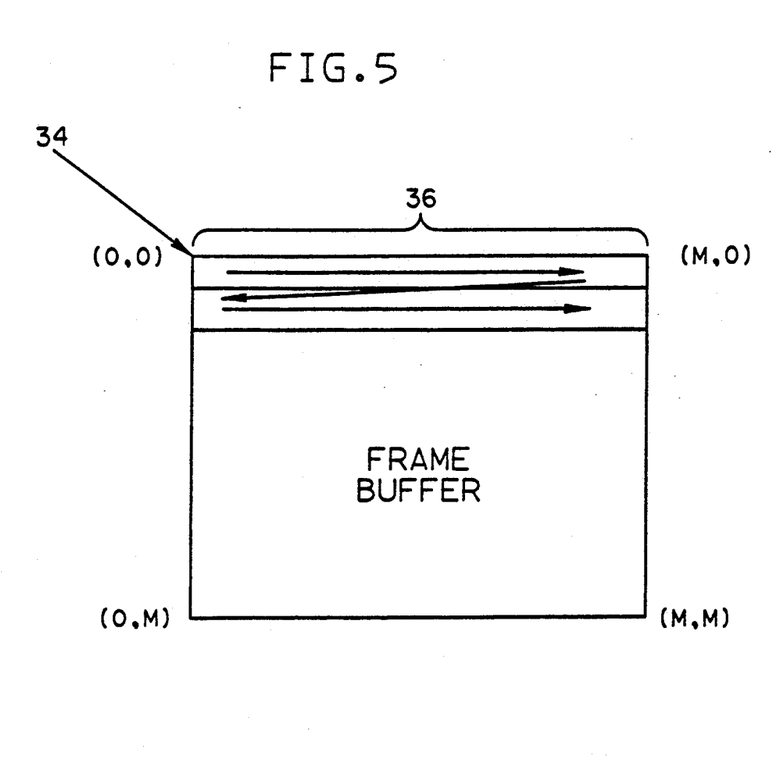
FIG. 5 is a diagram illustrating the relation between the image information and the storage address in the embodiment of FIG. 1.

Here, it is assumed that the source image information and the target image information are stored in the main storage 6 and the frame buffer 7, respectively, as indicated by the arrows in FIG. 5.

Now, the point generator 13 of FIG. 1 is described in detail.

As described, the mapping from the target image to the source image results in generation of hyperbola. It is put in order in the following. First, the above-mentioned equation (2) for mapping is repeated below.

$$x=(A_1x'+B_1y'+C_1)/(D_1x'+E_1y'+F_1)$$
$$y=(A_2x'+B_2y'+C_2)/(D_1x'+E_1y'+F_1) \quad (2)$$

For a range where the scanning line number of the target image, or $y'$, is constant, these equations can be rewritten as follows by appropriately shifting the origin:

$$f_1(x, x')=xx'-k_1=0$$
$$f_2(y, x')=yx'-k_2=0 \quad (3)$$

In addition, they can be expressed in a general form as follows:

$$f(X, Y)=XY-K=0 \quad (4)$$

Figure 6:
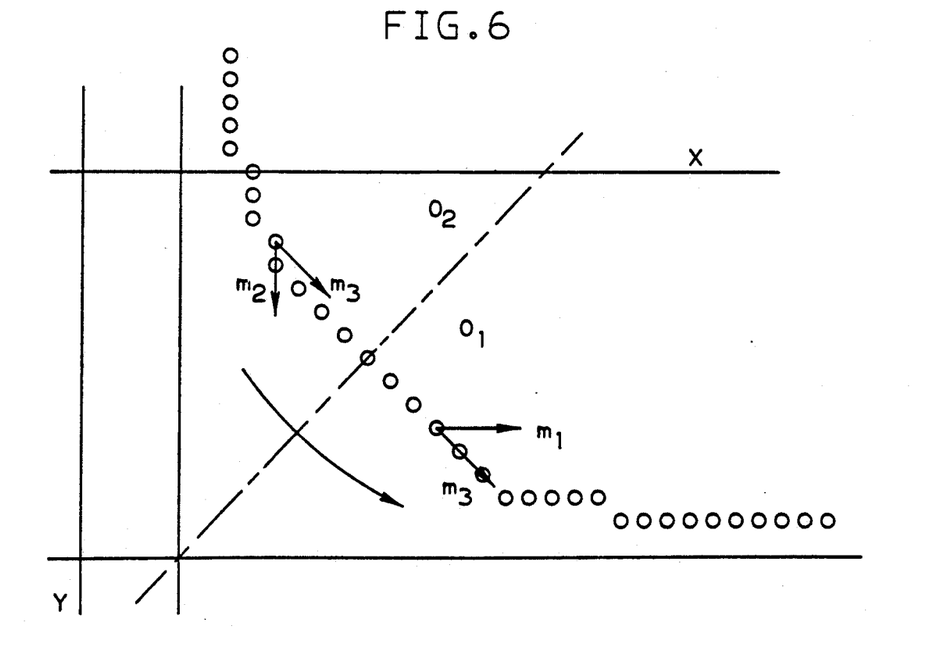
FIGS. 6 and 7 are graphs illustrating a point generator 13 according to the embodiment of FIG. 1.

Thus, the mapping of the equation (2) finally results in the generation of a hyperbola shown in FIG. 6.

The point generator 13 selects a range of points $P_i(X_i, Y_i)$, $i=1, 2, \ldots$ on the point in each processing stage that is closest to a true hyperbola, and therefore makes minimum the absolute value of the error term $F(P_i)=f(X_i, Y_i)=X_iY_i-K$ that is the equation (4) substituted for the coordinate value of the point. Now, if it is assumed in FIG. 6 that the equilateral hyperbola to be generated is in the range of the octant $O_1$, it is seen that the orientation of the range of points selected by the point generator is limited only either to the right ($m_l$) or the lower right ($m_3$). The case of the octant $O_2$ will be described later.

Figure 7:
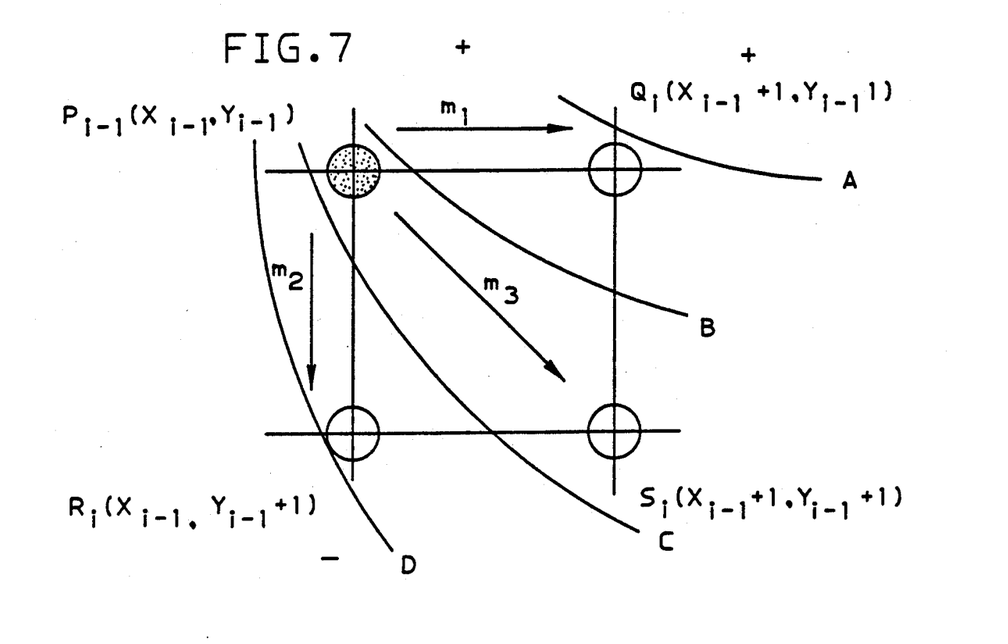

FIG. 7 shows possible cases (A to D) in which an equilateral hyperbola with a positive gradient passes around a unit cell. Now, it is assumed that the point $P_{i-1}$ is selected to be closest to the hyperbola for $X=X_{i-1}$. The point generator must determine whether the point $Q_i$ or $S_i$ is the closer to the hyperbola, for the next processing step of $X=X_{i-1}+1$. Thus, the following equation is defined:

$$F(Q_i)=(X_{i-1}+1) Y_{i-1}-K$$
$$F(S_i)=(X_{i-1}+1)(Y_{i-1}+1)-K \quad (5)$$

$|F(Q_i)| \geq |F(S_i)|$, the point $S_i$ is at a distance closer or equal to the true hyperbola than the point $Q_i$. On the contrary, if $|F(Q_i)| < F(S_i)|$, $Q_i$ is closer to the hyperbola than $S_i$. Therefore, it is sufficient to select the point $Q_i$ by the sign of a control variable $d_i$ that is defined as $d_i=|F(Q_i)|-|F(S_i)|$. That is, it is sufficient to select the point $S_i$ for $D_i>0$, and the point $Q_i$ for $d_i<0$.

In a case where the hyperbola passes the unit cell as indicated by B, $F(Q_i)>0$ and $F(S_i)<0$, and the control variable can be then expressed as:

$$d_i = F(Q_i) + F(S_i) \qquad (6)$$

Here, a corresponding value of $d_i$ is examined from the equation (6) for a case where the hyperbola passes through A. Obviously, $F(Q_i)<0$ and $F(S_i)<0$, and therefore, it is seen that the selection of the point $Q_i$ can be derived by again applying the selection rule for the above case for B. In addition, for a case where the hyperbola passes through C, $D_i>0$ because $F(Q_i)>0$ and $F(S_i)>0$, and the point $S_i$ is selected by the same rule.

Although the calculation of $d_i$ according to the equation (6) involves several multiplications, when the equation (5) is substituted for it, it can be arranged into an equivalent recurrence formula consisting of only additions and subtractions, and shifting operations, $$d_0 = 2((X_o+1)Y_o - K) + (X_o+1),$$

when the point $Q_i$ is selected ($d_i<0$), $$d_{i+1} = d_i + 2Y_{i-1} + 1 \qquad (7)$$

and, when the point $S_i$ is selected ($d_i>0$), $$d_{i+1} = d_i + 2(Y_{i-1} + X_{i-1}) + 7.$$

An equilateral hyperbola in the range of octant $O_2$ can be constituted in the same manner as for the octant $O_1$, except that the orientation of the range of points selected by the point generator is only either to the lower right ($m_3$) or to the bottom ($m_2$). The point generator determines which point $R_i$ or $S_i$, is closer to the hyperbola for $Y+Y_{i-1}+1$. To this end, it is sufficient to, in place of the equation (5), define $$F(R_i) = X_{i-1}(YY_{i-1}+1) - K$$

$$F(S_i) = (X_{i-1}+1)(Y_{i-1}+1) - K \qquad (8)$$

and to select the point by the sign of another control variable $e_i - F(R_i) + F(S_i)$, that is, to select $S_i$ if $e_i<0$, and $R_i$ if $e_i>0$. The value of the control variable $e_i$ can be incrementally calculated as in the equation (7) according to a recurrence formula $$e_o = 2((X_o+1)Y_o - K) + (X_o+1),$$

when the point $S_i$ is selected ($e_i \geq 0$), $$e_{i+1} = e_i + 2(Y_{i-1} + X_{i-1}) + 7 \qquad (9)$$

and, when the point $R_i$ is selected ($e_i<0$)

$$e_{i+1} = e_i + 2Y_{i-1} + 1.$$

If it is intended to draw an equilateral hyperbola on a raster display device, it is not necessary to take the trouble to constitute the above generating equation for the case of octant $O_2$ separately from equation (7). This is because the equilateral hyperbola is symmetrical to a line $Y=X$, and therefore, the area for the octant $O_2$ can be easily drawn by diagonally rotating the range of lattice points obtained from the equation (7). However, in this case, the equilateral hyperbola is drawn in the area of octant $O_1$ in a direction in which the X coordinate value increases, and, on the other hand, is drawn in the area of octant $O_2$ in the direction in which the X coordinate value decreases. As to the invention, the direction generating the range of points must always be on a one in which the X coordinate value increases throughout all areas because the point generator is constituted to correlate the pixel strings between a source image and a transformed image in the transformation processing of an image.

Figure 8:
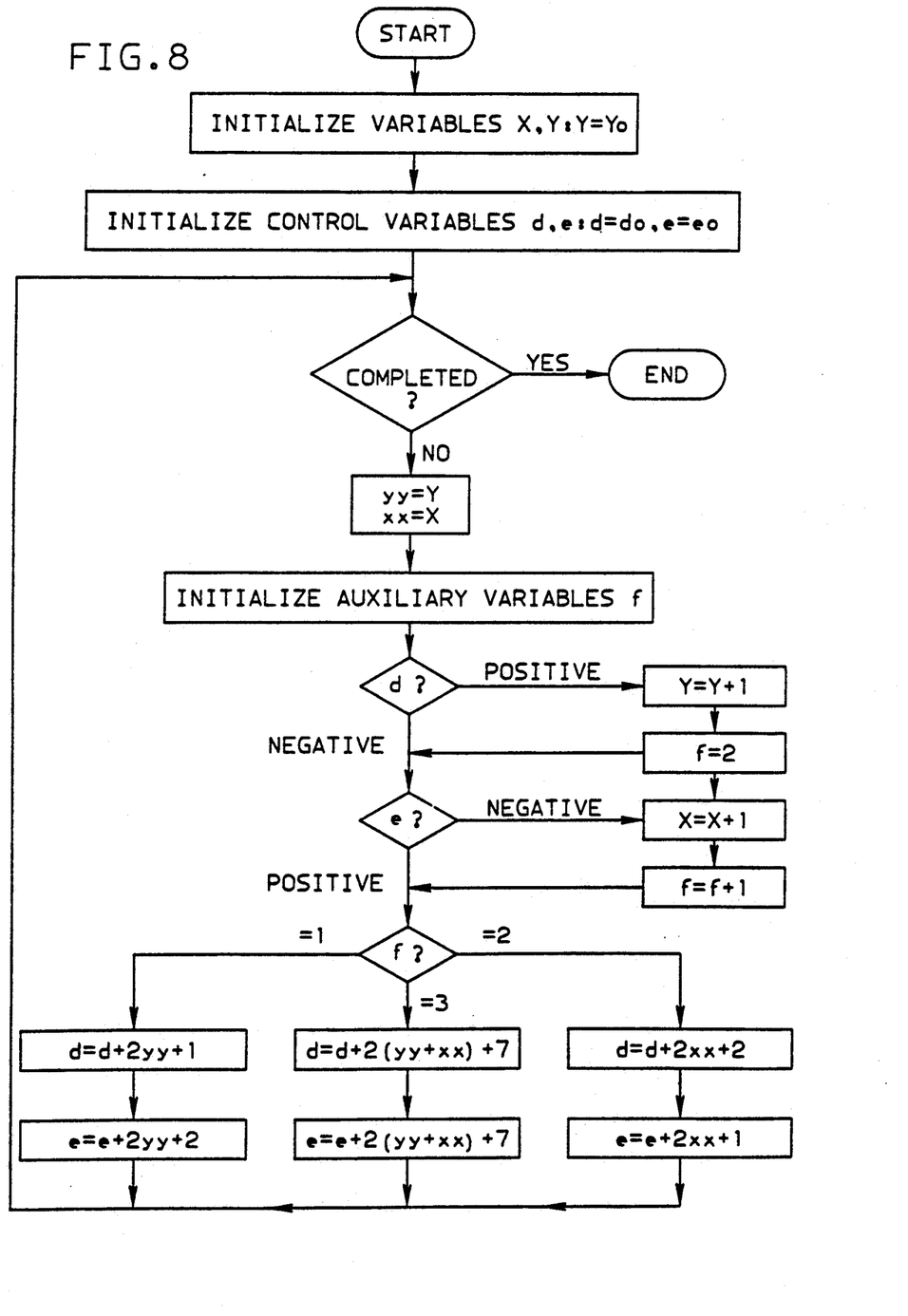
FIG. 8 is a similar flowchart.

Thus, to constitute a point generator that continuously generates equilateral hyperbolas while considering switching from the octant $O_1$ to $O_2$, it is sufficient to combine the equations (7) and (9) as shown in the flowchart of FIG. 8 by introducing a new auxiliary variable f.

The contents of FIG. 8 are not described because they are obvious from the above-mentioned equations (7) and (8).

According to the above-mentioned embodiment, the value of one pixel is stored in one address. This is for application to a gray scale or color image. In case of a bi-level image, it is possible to store the values for multiple pixels, for example, values of pixels of 8 bits, in one address. In that case, it is preferable to read the source image information byte by byte, and to write it as the target image information, byte by byte. To this end, it is necessary to read the source image information along the scanning line, and similarly to write the target image information along the scanning line. This requirement can be satisfied by dividing the projective transformation into a product of two transformations that can be processed in the raster scanning direction. This is described in detail as "Two-path Technique" in E. Catmull and A. R. Smith, "3-D Transformation of Images in Scanline Order," SIGGRAPH Proceedings, July, 1980, pp. 279-285.

Although the invention has been described with references to a preferred embodiment thereof, it will be understood by those skilled in the art that various changes may be made without departing from the spirit or scope of the invention.

What is claimed is:

1. Image processing apparatus for performing transformation from a source image to a target image along a plurality of consecutive lines parallel to one of the coordinate axes of said source image or said target image, comprising:

a point generator that sequentially determines points near a desired hyperbola and distributed along said hyperbola, and outputs a plurality of determined lattice points as an approximate curve of said hyperbola;

mapping means for determining a mapping between coordinates of pixels of said source image and coordinates of pixels of said target image based on the output of said point generator; and means for determining values of each of said pixels of said target image based on said mapping and values of one of said pixels of said source image mapped to said target image.

2. Image processing apparatus according to claim 1 wherein said desired hyperbola lies in a plane defined by said coordinate axes, said plane being divided into eight equal octants, and wherein, when sequentially determining each point constituting a part of said approximate curve, said point generator generates a plurality of candidate adjacent points in each of a plurality of directions according to the octant to which a just determined point belongs, said candidates representing a part of said approximate curve following said just determined point; and wherein said point generator determines one of said candidate points to be a part of said approximate curve following said just determined point based on the distance between each of said candidate points and said desired hyperbola.

3. Image processing apparatus according to claim 2, wherein said point generator performs said determination of said selected point based on the distance by using a recurrence formula.

* * * * *